United States Patent
Brown

[11] Patent Number: 5,113,768
[45] Date of Patent: May 19, 1992

[54] CABLE-SUSPENDED APPARATUS FOR SUPPORTING A STABILIZED CAMERA ASSEMBLY

[76] Inventor: Garrett W. Brown, 515 Addison Ct., Philadelphia, Pa. 19147

[21] Appl. No.: 670,295

[22] Filed: Mar. 15, 1991

[51] Int. Cl.$^5$ ............................................... B61B 7/00
[52] U.S. Cl. .................................. 104/112; 104/173.1; 104/238; 105/149.2; 248/123.1; 354/74; 354/81
[58] Field of Search .............. 104/89, 112, 115, 173.1, 104/173.2, 180, 229, 238; 105/149.2, 149.1, 148, 150; 358/229, 182; 354/81, 82, 74; 248/123.1, 324, 327, 326, 325

[56] References Cited

U.S. PATENT DOCUMENTS

| | | | |
|---|---|---|---|
| 2,725,783 | 12/1955 | Jackson | 358/229 |
| 3,044,346 | 7/1962 | Fieux | 248/123.1 |
| 4,027,329 | 5/1977 | Countta | 358/229 |
| 4,387,812 | 6/1983 | Biller et al. | 104/115 |
| 4,414,439 | 10/1984 | Brown | 358/229 |
| 4,710,819 | 12/1987 | Brown | 358/229 |

Primary Examiner—Robert J. Oberleitner
Assistant Examiner—Mark T. Le
Attorney, Agent, or Firm—Weiser & Stapler

[57] ABSTRACT

An ultralight cable car for use in conjunction with a "Steadicam ®" support apparatus. The cable car generally takes the form of a trolley adapted for traversal along a cable suspended between two fixed end points, and a shaft and concentric sleeve suspended from the trolley. The shaft suspended from the trolley is fixed against rotation, and has a steering surface fixed to its terminating end. The outer sleeve incorporates a mounting for receiving a conventional "Steadicam ®" support apparatus, and an opposing seat for the camera operator. Rotation of the outer sleeve relative to the inner shaft is accomplished by the camera operator, by pressing against the steering surface fixed to the base of the inner shaft, in conjunction with desired operations of the "Steadicam ®" support apparatus. A brake mechanism is provided to give the camera operator additional control in regulating movements of the trolley, and the apparatus, along the suspended cable which supports it.

15 Claims, 5 Drawing Sheets

CABLE-SUSPENDED APPARATUS FOR SUPPORTING A STABILIZED CAMERA ASSEMBLY

BACKGROUND OF THE INVENTION

The present invention generally pertains to camera systems for use in producing motion picture films and videotape recordings, and more particularly, to an apparatus for supporting a stabilized camera assembly useful in producing such film and videotape recordings.

U.S. Pat. No. 4,017,168, issued to this applicant, discloses a stabilized camera support apparatus marketed under the trademark "Steadicam ®" by Cinema Products Corporation of Los Angeles, Calif. This apparatus, which has been used to produce stabilized film and videotape recordings in a variety of applications, has proven to be a versatile tool in the industry. In use, the support apparatus is generally carried by a camera operator, its originally intended purpose. However, the support apparatus has also found utility in conjunction with different types of vehicles including automobiles, motorcycles, airplanes and helicopters.

Despite its versatility, there have been difficulties in using the "Steadicam ®" support apparatus to execute aerial shots in close proximity to the ground. Factors of safety and turbulence produced by airplanes and helicopters tend to make such use impracticable. This led to the development of other approaches to the execution of aerial shots of this general type.

One example of this is the apparatus marketed under the trademark "Skycam ®" by Skyworks, Inc. of Philadelphia, Pa., which is the subject of U.S. Pat. No. 4,710,819, also issued to this applicant. This apparatus generally employs a camera support which is suspended from a series of cables, and which can be moved within a defined region responsive to synchronized motor drives. The camera support is mechanically interconnected with the cables in such a way that movements of the camera support within its defined region of view are made possible, while stabilizing the camera which is suspended from the camera support. With this apparatus, aerial shots in close proximity to the ground are made possible with a full range of camera operations, including traditional panning and tilting of the camera. However, despite the excellent capabilities which such a system can provide, it is relatively expensive and often ruled out as a matter of practicality for the more routine motion picture film and videotape applications which may be contemplated.

Another system which has been developed for making aerial shots in close proximity to the ground is the so-called "Cablecam" system, developed by this applicant. This apparatus permits a remote-controlled camera to be moved along a single cable suspended between two fixed points. As such, aerial shots in close proximity to the ground are made possible in a relatively simple and straightforward fashion which makes the system quite cost-effective. However, the camera movements achievable with such a system are somewhat limited in that the camera is primarily adapted to look forward, and cannot be panned or tilted as it progresses along the cable from which it is suspended.

Many motion picture film and videotape productions employ the "Steadicam ®" camera support, making this apparatus readily available for varied applications. However, there was previously no vehicle which could be used to receive the "Steadicam ®" support apparatus and the camera operator needed to operate the apparatus, leaving only the above-discussed devices to make aerial shots in close proximity to the ground which involved travel over terrain that might otherwise rule out the use of conventional cranes, dollies, or even the "Steadicam ®" support apparatus (e.g., the traversal of rivers, busy intersections, valleys, alleys, construction sites or the like), limiting the ability to carry out shots of this general nature. It therefore remained to develop a vehicle which could satisfy this need of the motion picture and video industries.

SUMMARY OF THE INVENTION

It is therefore the primary object of the present invention to provide an improved apparatus for executing aerial shots in close proximity to the ground.

It is also an object of the present invention to provide an apparatus for executing aerial shots in close proximity to the ground which can employ a "Steadicam ®" support apparatus, to take full advantage of the versatility which such a support apparatus can provide.

It is also an object of the present invention to provide an apparatus for executing aerial shots in close proximity to the ground which is easily set up, and which is easily operated, to reduce costs both in initial set up of the apparatus and in subsequent operations of the apparatus as part of a desired motion picture film or videotape production.

These and other objects are achieved in accordance with the present invention by providing what essentially constitutes an ultralight cable car apparatus that can be used in conjunction with a "Steadicam ®" support apparatus. The cable car generally takes the form of a trolley adapted for traversal along a cable suspended between two fixed end points, and a shaft and concentric sleeve suspended from the trolley. The shaft suspended from the trolley is fixed against rotation, and has a steering surface fixed to its terminating end. The outer sleeve incorporates a mounting for receiving a conventional "Steadicam ®" support apparatus, and an opposing seat for the camera operator. Rotation of the outer sleeve relative to the inner shaft is accomplished by the camera operator, by pressing against the steering surface fixed to the base of the inner shaft, in conjunction with desired operations of the "Steadicam ®" support apparatus. A brake mechanism is provided to give the camera operator additional control in regulating movements of the trolley, and the apparatus, along the suspended cable which supports it.

The result is a secure and versatile, ultralight cable car that serves to augment the stabilizing abilities of the "Steadicam ®" support apparatus, and which offers a fixed mounting for the support apparatus so that the camera operator does not have to wear the equipment on his or her body. This is particularly important in conjunction with vehicle-based operations in that operator fatigue tends to be greater in situations where the support apparatus is not worn while erect (standing). Providing a fixed mounting for the support apparatus greatly reduces the potential for operator fatigue by eliminating the need for the operator to have to wear the equipment while in a seated position, which is otherwise appropriate for achieving desired aerial shots in close proximity to the ground employing the "Steadicam ®" support apparatus.

For further detail regarding a preferred embodiment cable car apparatus in accordance with the present invention, reference is made to the detailed description which is provided below, taken in conjunction with the following illustrations.

DETAILED DESCRIPTION OF THE PREFERRED EMBODIMENT

Figure 1:
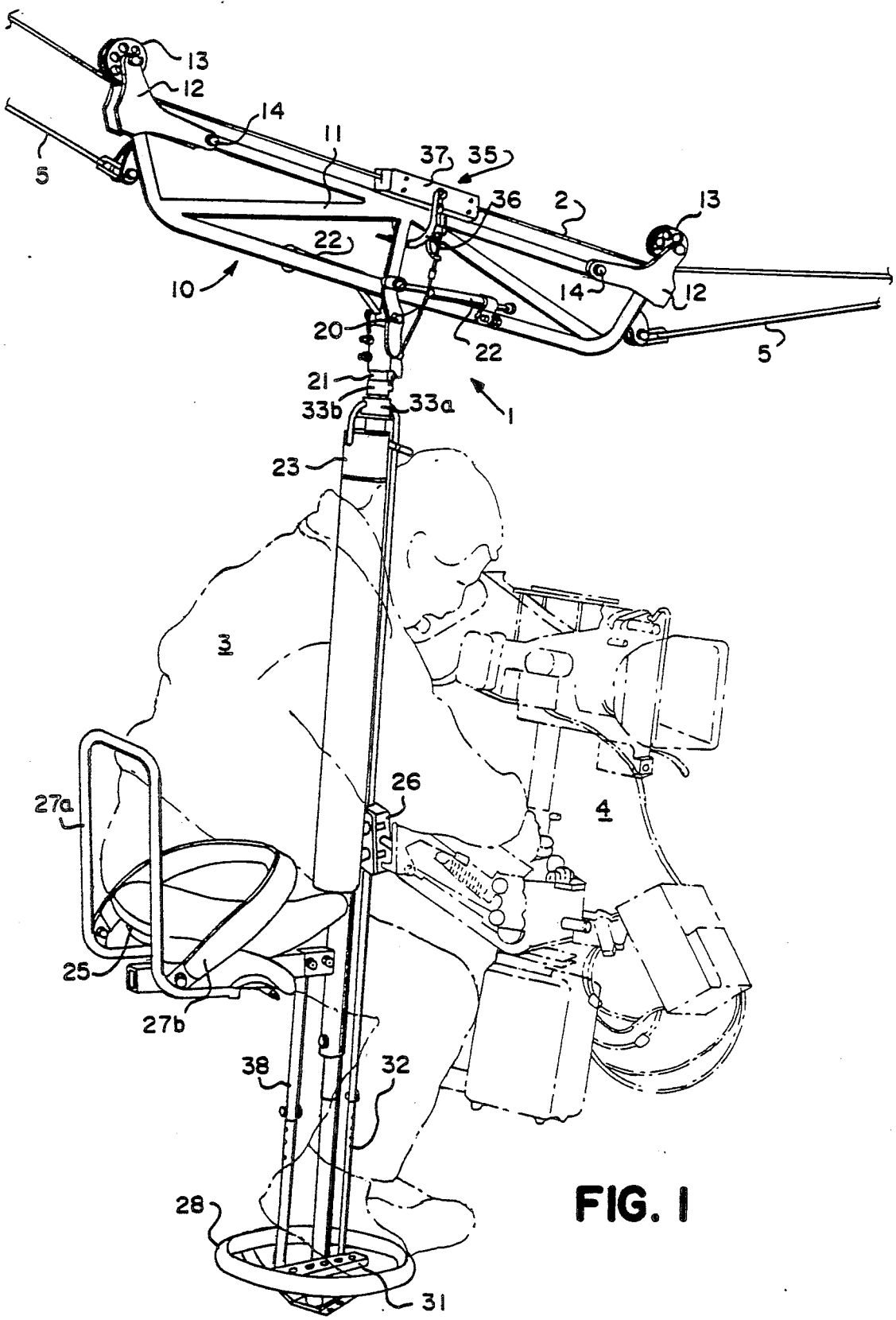
FIG. 1 is a perspective view of the cable car apparatus of the present invention, also showing a camera operator making use of a "Steadicam ®" support apparatus.

Illustrated in FIG. 1 is a cable car 1 which can be supported between desired end points by a cable 2 attached to and extending between such end points. For example, the ends of the cable 2 may be attached to industrial or building cranes, booms, existing walls, arenas, trees, or any fixed structure which can support the weight of the device (and a camera operator and his or her equipment). It is even possible to direct the cable 2 through and between potential obstacles such as trees, buildings, walls, light and utility poles and the like, so long as sufficient space is provided to permit passage of the cable car 1, the camera operator 3, and a "Steadicam ®" support apparatus 4.

Additional cables 5 are attached to the cable car 1, and are used to develop desired movements along the cable 2. Such motion may be accomplished by stationing persons at the ends of the cables 5, to manually produce desired movements of the cable car 1. It is also possible to attach the ends of the cables 5 to motor operated winches (not shown) or the like, to achieve powered movements of the cable car 1 along the cable 2 if desired.

Figure 2:
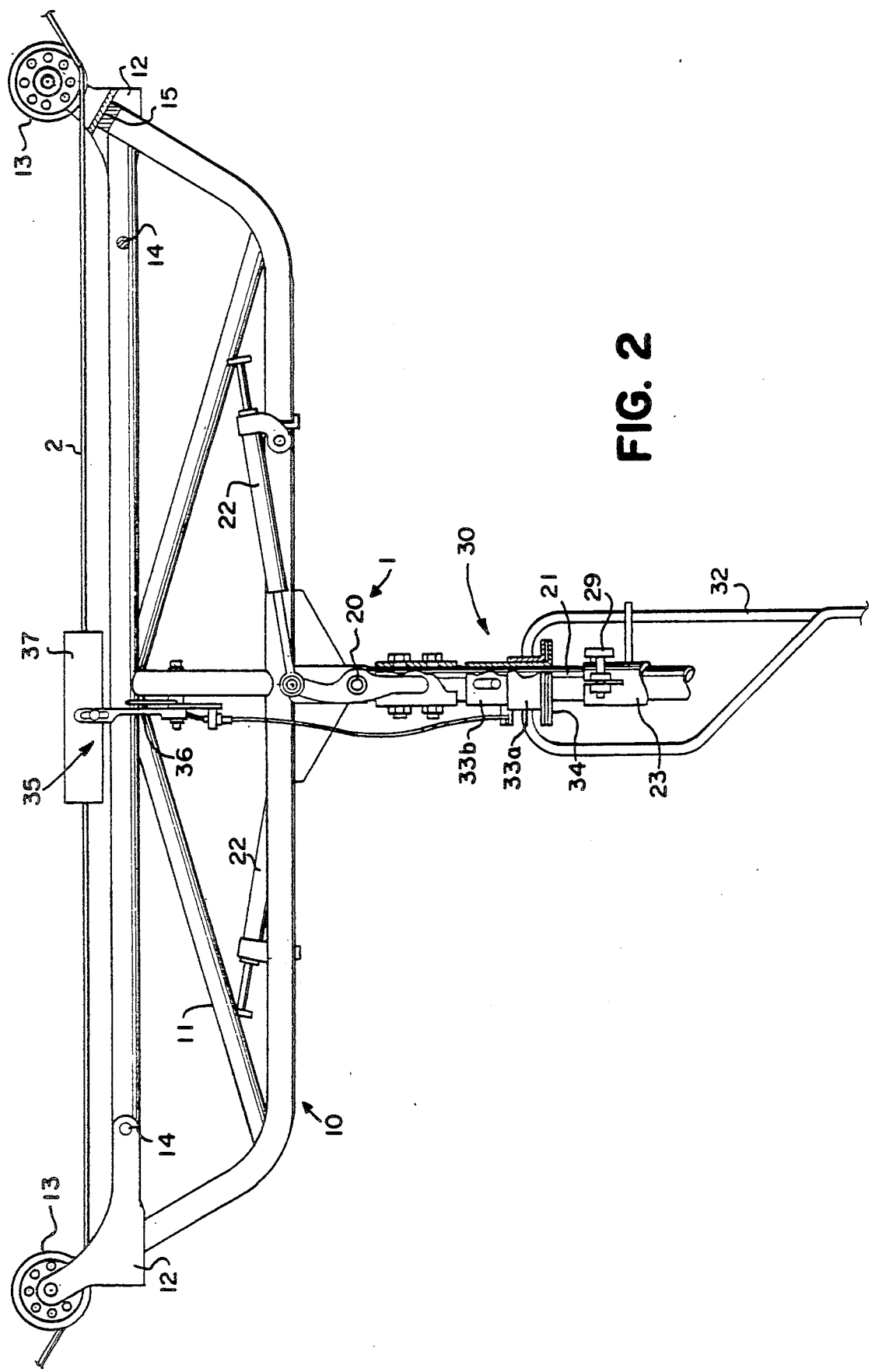
FIG. 2 is a side elevational view of upper portions of the cable car apparatus of FIG. 1.

The cable car 1 is suspended from the cable 2 by a trolley 10. The trolley 10 generally takes the form of a frame 11, opposite ends of which are provided with pulley supports 12 for interacting with the cable 2. As is best illustrated in FIG. 2 of the drawings, each pulley support 12 includes a pulley 13 which rests upon the cable 2 and a pivot 14 for interconnection with its respective end of the frame 11. A damper 15 is positioned between each of the pulley supports 12 and adjacent portions of the frame 11 to reduce vibrations which may propagate from the pulley/cable interconnection to the remainder of the cable car 1. An appropriate elastomer is preferably used for this purpose.

Figure 3:
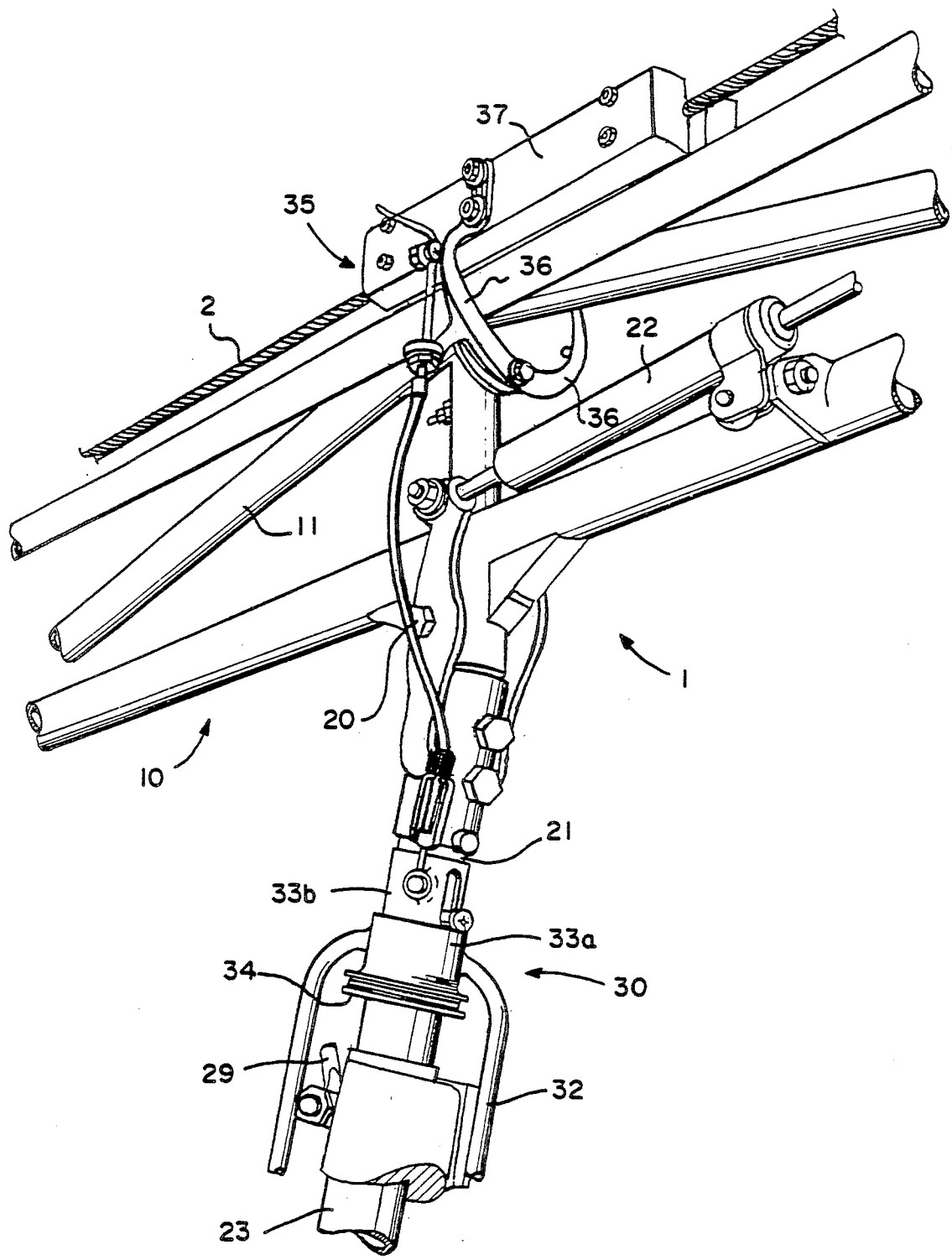
FIG. 3 is an enlarged, perspective view of upper portions of the cable car apparatus, as shown in FIG. 2.

Referring now to FIGS. 2 and 3, centrally located along the frame 11 is a pivot 20 for receiving a fixed shaft 21 depending from the frame 11. The pivot 20 extends generally transverse to the frame 11, and the cable 2, to permit fore and aft movement of the fixed shaft 21 relative to the trolley 10. A pair of shock absorbers 22 preferably interconnect the fixed shaft 21 and the frame 11 to dampen (but not eliminate) fore and aft movements of the fixed shaft 21 relative to the trolley 10.

The primary reason for such structure is that in operating the support apparatus 4, it is generally of the greatest benefit to the camera operator to have the surface that accepts the support apparatus remain as nearly vertical as possible. When affixed to a camera operator, the erect (standing) position of the operator is sufficient for this purpose. When affixed to the cable car 1 of the present invention, the generally vertically oriented fixed shaft 21 operates to serve this purpose.

It is further desirable that the surface which receives the support apparatus 4 lean back during periods of deceleration and lean forward during periods of acceleration, to maximize the stability of the support apparatus while in use. When worn by a camera operator, this is a natural result of conventional usage. However, when used in conjunction with a vehicle, or a vehicular mounting, the opposite condition tended to prevail in that vehicles tend to "dive" forward during deceleration, and to "lift" back during periods of acceleration. This resulted in a tendency for the expanded balanced arrangement of the support apparatus 4 (which is responsible for its effective operation) to be affected in such a way that the support apparatus 4 would be drawn out of balance and would no longer be operating at its maximum efficiency. This could result in sudden thrusting of the camera away from, or toward the camera operator, a clearly undesirable result. The cable car 1 of the present invention is not subject to such limitations in that the fixed shaft 21 is pivoted relative to the trolley 10 so that desired movements (fore and aft) of the support apparatus 4 will result during accelerations and decelerations of the cable car 1 relative to the cable 2.

Figure 4:
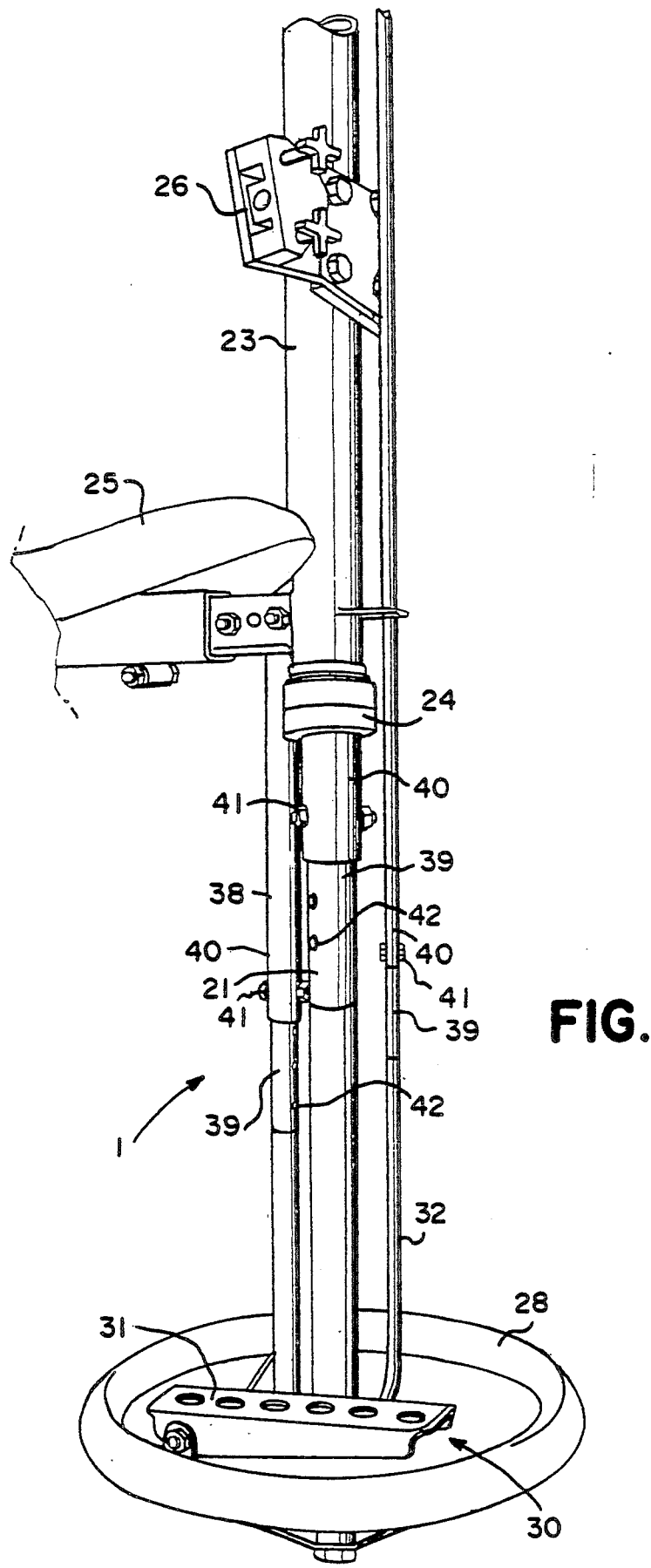
FIG. 4 is a partial, perspective view of lower portions of the cable car apparatus of FIG. 1.
Figure 5:
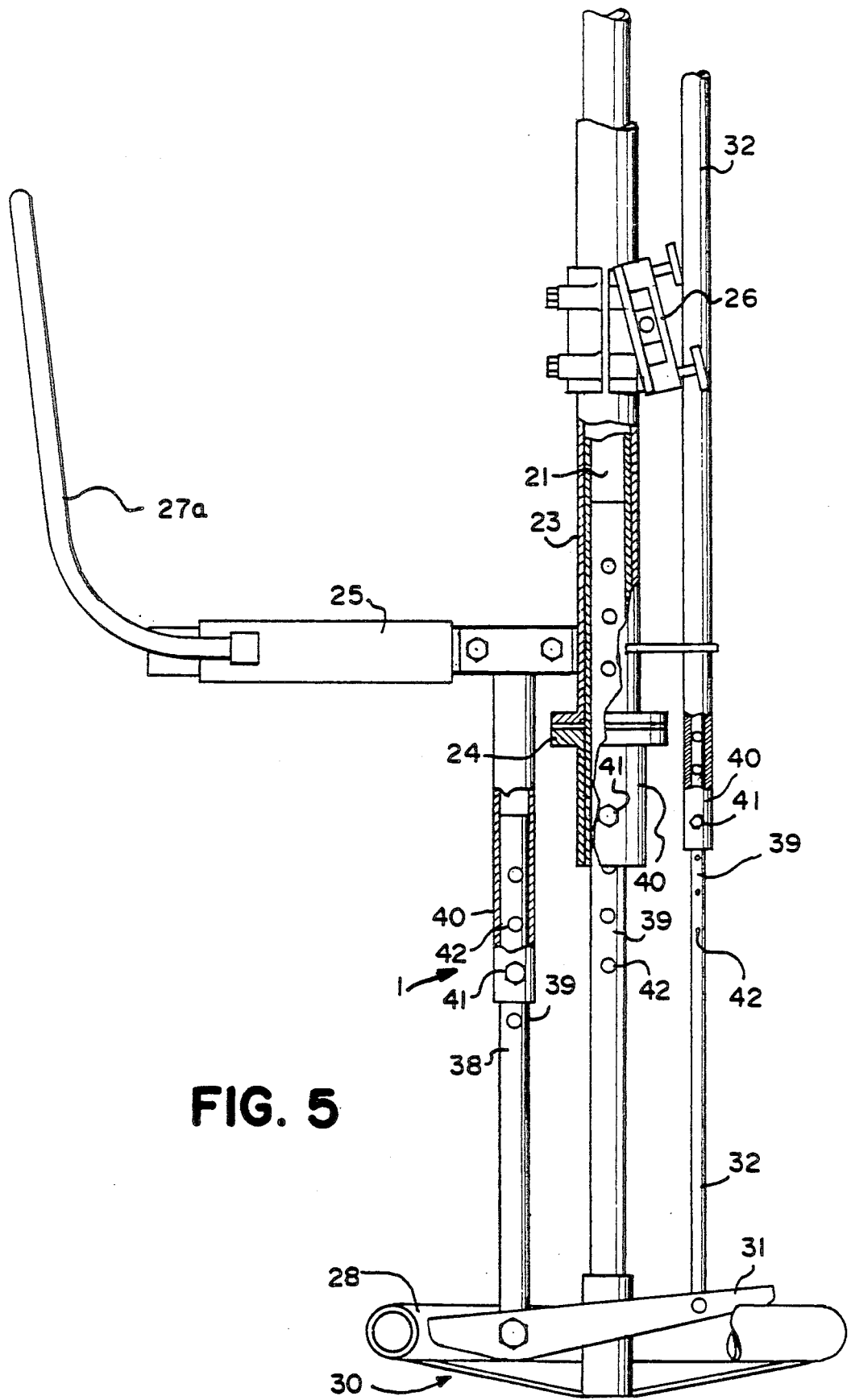
FIG. 5 is a sectional view of those portions of the cable car apparatus which are shown in FIG. 4.

Referring now to FIGS. 4 and 5, surrounding the fixed shaft 21 is a tubular sleeve 23. The sleeve 23 is supported in position over the fixed shaft 21 by a collar 24 which is fixed to the shaft 21. As a result of this structural interconnection, the sleeve 23 is made fully rotatable (by 360 degrees) about the fixed shaft 21. Extending from the sleeve 23 is a seat 25 for the camera operator 3 and a mounting 26 for receiving the support apparatus 4. The seat 25 may incorporate a back rest 27a and a seatbelt 27b for the comfort and safety of the camera operator 3. The mounting 26 constitutes what is essentially a conventional mounting for receiving the support arm of a "Steadicam ®" support apparatus, in otherwise known fashion. In view of its intended purpose, the mounting 26 preferably incorporates a built-in rearward angle, as shown, and is double-sided to provide fixed left-hand and right-hand mountings for the support apparatus 4.

A bearing surface 28 is attached to the free end of the fixed shaft 21, opposite to the pivot at 20. This bearing surface 28 is provided so that the camera operator 3 can rotate the sleeve 23 seat 25 and mounting 26 relative to the fixed shaft 21 by applying a gentle force (with the operator's foot) to the bearing surface 28, which serves the function of a steering wheel. A thumbscrew 29 is provided which can be loosened or tightened, as desired, to free up or restrict such rotations.

Important to note is that the mounting 26 for the support apparatus 4 is fixed relative to the operator 3, and is essentially independent of the camera cable car 1. This not only has the beneficial effect of reducing fatigue of the camera operator 3, particularly in view of the seated position which is desired for operating the cable car 1, but also has the beneficial effect of facilitating free rotations of the support apparatus 4 and the camera operator 3 about the axis defined by the fixed shaft 21. This affords a significantly increased range of rotation, particularly in conjunction with panning of the camera, which was often inherently restricted in conjunction with vehicular operations due to the seated position of the camera operator.

Also important to note is that the seat 25 is preferably diametrically opposed to the mounting 26. The reason for this is that in such a configuration, the weight of the camera operator 3 can be effectively counter-balanced by the weight of the support apparatus 4. While it is generally the case that the camera operator 3 will be significantly heavier than the support apparatus 4, such balance is nevertheless maintained by retaining the support apparatus 4 at an appropriate distance from the concentric fixed shaft 21 and sleeve 23, which can be controlled by the camera operator 3. The result of this is that the concentric fixed shaft 21 and sleeve 23 will remain essentially vertical when the cable car 1 is in operation, as is preferred. Such balance can be maintained even when the camera operator 3 and support apparatus 4 are disposed at an angle relative to the direction of travel of the cable car 1, the result being that sudden changes in speed will not cause unintentional and undesired rotations of the sleeve 23 relative to the fixed shaft 21. What is more, the pivoted interconnection between the fixed shaft 21 and outer sleeve 23 which surrounds it, and the trolley 10 which supports these structures, ensures appropriate pendular movements (leaning back and tilting forward) during decelerations and accelerations of the cable car 1 when in operation. This is so regardless of the orientation of the camera operator 3 and support apparatus 4 relative to the cable 2 and trolley 10.

To provide the camera operator 3 with additional control of movements of the cable car 1 along the cable 2, the cable car 1 further preferably incorporates a brake mechanism 30. The brake mechanism 30 operates responsive to a foot pedal 31, which pivotally extends from a mounting 38 attached to and beneath the seat 25, and which is preferably nested within the bearing surface 28. Depression of the foot pedal 31 by the camera operator 3 causes retraction of a rod 32 which extends along the sleeve 23, to a slip-ring collar 33a (FIGS. 2 and 3) which overlies a slide 33b associated with the inner shaft 21. The slip-ring collar 33a freely rotates relative to the fixed slide 33b so that rotations of the sleeve 23 relative to the fixed shaft 21 will not compromise the brake mechanism 30. This also permits the foot pedal 31 to be maintained in the same orientation relative to the camera operator 3, irrespective of rotations which are being performed. The slide 33b includes a flange 34 which can be engaged by the slip-ring collar 33a, so that retractions of the slip-ring collar 33a will cause retraction of the slide 33b which it overlies. A cable interconnects the slide 33b with a caliper-type brake 35. The brake 35 includes a pair of arms 36 which extend along opposite sides of the cable 2, and which receive brake pads 37 (formed of any of a variety of composites, or wood) for interacting with the cable 2 to achieve desired braking of the cable car 1. As a result, depression of the foot pedal 31 operates to close the brake pads 37 over the cable 2, providing the braking action which is desired irrespective of the orientation of the camera operator 3 and the support apparatus 4 relative to the direction of travel of the cable car 1.

Although the cable car 1 could conceivably be fitted (sized) to a particular camera operator 3, adjustment of the cable car 1 to suit the camera operator 3 is clearly desirable. To this end, the fixed shaft 21, the sleeve 23, and the mounting 38 for the foot pedal 31, are preferably formed as split shafts having telescoping inner segments 39 and outer segments 40 which can be interconnected by bolts 41 extending through spaced apertures 42 formed in the inner and outer segments 39, 40. This permits comfortable adjustment of the distance between the seat 25, and the bearing surface 28 and foot pedal 31, as desired.

In use, the apparatus of the present invention is easily set up by attaching the cable 2 to and between fixed end points appropriately selected to achieve the particular "shot" which is desired, and by suspending the cable car 1 from the attached cable 2. The cables 5 are similarly rigged for movement of the cable car 1 along the cable 2. The only other adjustment which may at times be required is adaptation of the cable car 1 to a particular camera operator, which is readily accomplished by adjustment of the split shafts of the fixed shaft 21, the sleeve 23 and the mounting 38, as desired. The support apparatus 4 is affixed to the mounting 26, following set-up procedures inherent to operation of a "Steadicam ®" support apparatus which are known to those in the industry and therefore need not be addressed in detail. As a result, the support apparatus 4 is made ready for aerial shots in close proximity to the ground with a minimum of expense and preparation.

Once in position upon the seat 25 of the cable car 1, the camera operator 3 is able to perform a full range of typical operations achievable using a "Steadicam ®" support apparatus in conjunction with the film or video camera which is being employed, unencumbered by the cable car 1, or the equipment which it supports. Rotations of the cable car 1 are achieved by forces applied to the bearing surface 28 by the feet of the camera operator 3, and braking is achieved by applying pressure to the foot pedal 31, as desired. Despite such versatility, the camera operator 3 is made substantially immune to the effects of sudden changes in velocity since the pivoted fixed shaft 21 and sleeve 23 cooperate to prevent the camera from shooting toward or away from the camera operator while in use, and to effectively lean forward and lean backward upon accelerations and decelerations of the unit, as is desired. In such case, the support apparatus 4 merely lowers on its supporting arm, as its apparent mass is appropriately altered by accelerations and decelerations of the cable car 1, which is the desired result.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for receiving a stabilized camera support for use by a camera operator, the apparatus comprising:
    a trolley for traversing a cable attached to and between fixed end points;
    a shaft including a connection means for pivotally connecting the shaft to the trolley and for fixing the shaft against rotation relative to the trolley;
    a sleeve overlying the shaft and including a seat for the camera operator and a mounting for receiving the stabilized camera support; and
    a bearing surface connected to the shaft, at an end opposing the connection means of the shaft, for causing rotation of the sleeve, seat and mounting relative to the shaft and trolley responsive to forces applied to the bearing surface by the camera operator.

2. The apparatus of claim 1 wherein the trolley includes pulleys for engaging the cable, and which includes means for dampening vibrations developed as the pulleys traverse the cable.

3. The apparatus of claim 2 wherein the dampening means includes a pulley support pivotally connected to a frame of the trolley and an elastomer separating the pulley support and the frame.

4. The apparatus of claim 1 wherein the trolley is movable along the cable responsive to additional cables affixed to the trolley.

5. The apparatus of claim 1 wherein the trolley is movable in a direction extending along the cable, and wherein the trolley and the shaft are interconnected by a pivot which extends generally traverse to the direction of movement of the trolley, thereby permitting fore and aft movement of the shaft relative to the trolley.

6. The apparatus of claim 5 wherein means for dampening fore and aft movement of the shaft relative to the trolley are attached to and extend between the trolley and the shaft.

7. The apparatus of claim 1 wherein the sleeve includes means for regulating rotation of the sleeve relative to the shaft.

8. The apparatus of claim 1 wherein the seat and the mounting diametrically oppose one another.

9. The apparatus of claim 1 wherein the seat and the bearing surface are separated by a fixed distance, and wherein the apparatus includes means for adjusting the fixed distance between the seat and the bearing surface.

10. The apparatus of claim 1 which further includes means for braking movements of the trolley along the cable.

11. The apparatus of claim 10 wherein the braking means operates irrespective of rotations of the sleeve relative to the shaft.

12. The apparatus of claim 11 wherein the braking means includes a foot pedal for depression by the operator, a rod interconnecting the foot pedal with a slip-ring collar assembly, and a cable interconnecting the slip-ring collar assembly with a brake for engaging the cable.

13. The apparatus of claim 12 wherein the slip-ring collar assembly includes a slide fixed against rotation and to the shaft, and a slip-ring collar overlying the slide and fixed to the rod.

14. A method for rigging a stabilized camera support for use by a camera operator in producing aerial shots, comprising steps of:
suspending a cable from and between a pair of fixed end points;
suspending a cable car from the cable, for movement along the cable, the cable car including a trolley for attachment to the cable, a shaft including a connection means for pivotally connecting the shaft to the trolley and for fixing the shaft against rotation relative to the trolley, a sleeve overlying the shaft and including a seat for the camera operator and a mounting for receiving the stabilized camera support, and a bearing surface connected to the shaft at an end opposing the connection means of the shaft; and
moving the trolley along the cable and rotating the sleeve, seat and mounting relative to the shaft and trolley responsive to forces applied to the bearing surface by the camera operator.

15. The method of claim 14 which further includes braking movements of the trolley along the cable.

* * * * *